(12) United States Patent
Shi et al.

(10) Patent No.: US 10,731,837 B2
(45) Date of Patent: Aug. 4, 2020

(54) LIGHTING MODULE AND METHOD OF CONTROLLING A LIGHTING SYSTEM

(71) Applicant: SIGNIFY HOLDING B.V., Eindhoven (NL)

(72) Inventors: Liang Shi, Eindhoven (NL); Weihong Zhao, Eindhoven (NL); Gang Wang, Eindhoven (NL); Peiliang Dong, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/334,445

(22) PCT Filed: Sep. 20, 2017

(86) PCT No.: PCT/EP2017/073746
§ 371 (c)(1),
(2) Date: Mar. 19, 2019

(87) PCT Pub. No.: WO2018/054958
PCT Pub. Date: Mar. 29, 2018

(65) Prior Publication Data
US 2019/0212001 A1   Jul. 11, 2019

(30) Foreign Application Priority Data

Sep. 26, 2016 (WO) ................ PCT/CN2016/100166
Nov. 2, 2016 (EP) ..................... 16196939
Jan. 18, 2017 (WO) ................ PCT/CN2017/071493

(51) Int. Cl.
*H05B 33/08* (2020.01)
*H05B 45/00* (2020.01)
(Continued)

(52) U.S. Cl.
CPC ............ *F21V 23/02* (2013.01); *F21V 23/005* (2013.01); *F21V 23/045* (2013.01); *F21V 29/70* (2015.01);
(Continued)

(58) Field of Classification Search
CPC ................ H05B 33/08; H05B 33/0803; H05B 33/0842; H05B 33/0896; H05B 45/00;
(Continued)

(56) References Cited

U.S. PATENT DOCUMENTS 6,828,530 B2 * 12/2004 Boegel ................ H05B 6/1218
219/506
7,400,253 B2   7/2008 Cohen
8,317,561 B2   11/2012 Sarfert et al.
8,915,609 B1   12/2014 Shah et al.
(Continued)

FOREIGN PATENT DOCUMENTS

CN   204291521 U   4/2015
CN   102980079 B   7/2015
WO   2016150718 A1   9/2016

*Primary Examiner* — Thai Pham
(74) *Attorney, Agent, or Firm* — Akarsh P. Belagodu

(57) ABSTRACT

A lighting module has a conducting track which is used to provide a current to lighting elements. The conducting track is also used as a source of a varying electromagnetic field for inductive power transfer, so that an external device may harvest energy from that field. A driver is used for providing a time-varying current which is adapted to illuminate the lighting elements and, in combination with the track configuration, is adapted to generate a varying electromagnetic field for inductive power transfer for energy harvesting by an external device.

15 Claims, 8 Drawing Sheets

(51) Int. Cl.
  *F21V 23/00* (2015.01)
  *H02J 50/10* (2016.01)
  *F21V 23/02* (2006.01)
  *H05B 45/37* (2020.01)
  *F21V 29/70* (2015.01)
  *F21V 23/04* (2006.01)
  *F21Y 115/10* (2016.01)

(52) U.S. Cl.
  CPC .............. *H02J 50/10* (2016.02); *H05B 45/00* (2020.01); *H05B 45/37* (2020.01); *H05B 45/60* (2020.01); *F21Y 2115/10* (2016.08)

(58) Field of Classification Search
  CPC ......... H05B 45/37; H05B 45/60; F21V 23/00; F21V 23/004; F21V 23/005; F21V 29/70; F21V 23/045; H02J 50/00; H02J 50/10
  See application file for complete search history.

(56) References Cited

U.S. PATENT DOCUMENTS

| | | | |
|---|---|---|---|
| 2006/0022214 A1* | 2/2006 | Morgan | F21K 9/00 257/99 |
| 2006/0198128 A1* | 9/2006 | Piepgras | B29C 39/10 362/147 |
| 2008/0203948 A1 | 8/2008 | Wu et al. | |
| 2010/0311502 A1* | 12/2010 | Miller | A63F 1/02 463/30 |
| 2014/0028186 A1* | 1/2014 | Montemayor | H01F 27/30 315/70 |
| 2015/0228696 A1* | 8/2015 | Diekmann | F21S 6/002 257/40 |
| 2015/0312989 A1* | 10/2015 | Wee | H05B 33/0854 315/113 |
| 2016/0033098 A1* | 2/2016 | Bergman | H02G 3/20 362/418 |
| 2019/0311848 A1* | 10/2019 | Chen | H01F 27/24 |

\* cited by examiner

LIGHTING MODULE AND METHOD OF CONTROLLING A LIGHTING SYSTEM

CROSS-REFERENCE TO PRIOR APPLICATIONS

This application is the U.S. National Phase application under 35 U.S.C. § 371 of International Application No. PCT/EP2017/073746, filed on SEP. 20, 2017, which claims the benefits of Chinese Patent Application No. PCT/CN2017/071493, filed on Jan. 18, 2017, European Patent Application No. 16196939.9, filed on Nov. 2, 2016, and Chinese Patent Application No. PCT/CN2016/100166, filed on Sep. 26, 2016. These applications are hereby incorporated by reference herein.

FIELD OF THE INVENTION

This invention relates to lighting modules and control methods for lighting systems.

BACKGROUND OF THE INVENTION

Lighting modules are used within luminaries to provide indoor or outdoor lighting solutions.

The energy which is supplied to a luminaire is dissipated as light, heat, and as electromagnetic interference (EMI) energy. Normally, the EMI energy is considered to be wasted energy dissipation, and magnetic shielding components are used to restrict radiation emission of EMI from a luminaire, and EMI filters are used to restrict the conducted emission of EMI.

This limits the efficiency of the luminaire in generating useful energy.

There is a trend for luminaries to become an integrated part of a more multifunctional and smarter lighting system, for example including sensors for automatic lighting control. To power these sensors and to provide wireless connectivity, battery operated devices are typically used, for reasons of system flexibility. Wireless batter operated devices can be positioned freely without the need for any particular wiring infrastructure. A battery requires periodic maintenance (for example every several months or years), and this provides a maintaining cost penalty to the implementation of a smart system having wireless sensors or other wireless components.

It is well known that in addition to wireless communications between devices, wireless power transfer is also possible. This typically requires a dedicated wireless power transmission system in one (power supplying) device and a dedicated wireless power harvesting system in the other (power receiving) device. This adds cost, volume and complexity to a system.

Visible light communication such as coded light is also promising. But there has not been an integration of both visible light communication and inductive transfer in the same lamp/luminaire.

SUMMARY OF THE INVENTION

There is therefore a need for a low cost and low maintenance way to power a device (such as a sensor) associated with a lighting module, for example so that a smart lighting system can be implemented.

A basic idea of the invention is re-using the track/trace on the layer 2 PCB (on which the lighting elements—typically LEDs—are mounted) as a radiator to radiate energy to power an external device like a sensor. The track/trace is shaped both to conduct current for the lighting elements and to be energized by the lighting element current to emit radiation. A driver is adapted to provide the lighting element current which also energizes the track/trace to emit radiation.

The invention is defined by the claims.

According to examples in accordance with an aspect of the invention, there is provided a lighting module comprising:

a substrate;

at least one conducting track on the substrate having a track configuration;

lighting elements mounted on the substrate along the at least one conducting track; and a driver for providing a current, via the track, to the lighting elements along the conducting track, wherein the driver is adapted to provide a time-varying current which is adapted to illuminate the lighting elements, wherein the track configuration is adapted to both conduct the current to the lighting elements (24) for illumination and generate a varying electromagnetic field for inductive power transfer for energy harvesting by an external device.

This lighting module generates an alternating electromagnetic field which can be used for energy harvesting. It makes use of the conducting track which is already used by the lighting elements (e.g. LEDs) and thus provides a compact and low-cost solution. Energy which would otherwise be wasted, for example by EMI filtering and EMI blocking, is instead positively used for energy harvesting purposes. The substrate is for example a rigid substrate, such as a resin or plastic board of the printed circuit board, and the track is the printed track on the printed circuit board.

The time-varying current has a frequency (of an AC component) suitable for generating an alternating electromagnetic field for inductive power transfer. The frequency is for example in the kHz to MHz range (for example 10 kHz to 100 MHz). The frequency is higher than the frequency with which the DC current level is adjusted, which is more likely to be in the sub −10 Hz frequency range (e.g. brightness level adjustments in response to ambient light changes or in response to user input).

In one set of examples, the track configuration for example comprises a smooth or angular spiral. Accordingly, the lighting elements are distributed along the spiral.

In this way, the overall shape of the track in the lighting module may be used to define a transmission inductor coil. Receiver coils may then be placed generally within the overall area of the lighting module to harvest power.

The driver is for example adapted to generate an alternating current waveform with a DC bias. In this case the LEDs can be driven without using a rectifier. The inductance of the track is at least 10 μH, for example more than 50 μH. This enables a quite strong signal strength for the power transfer. The lighting elements are distributed evenly or unevenly along at least one turn of the spiral, and/or the lighting elements are distributed evenly or unevenly over a plurality of turns of the spiral. This provides flexibility in placing the LEDs for a desired light output effect while also providing the power transfer. The diameter of the track depends on the luminaire design which can be as small as several centimeters (for small lap top luminaire or bulb) and as big as tens of centimeters (for a down light and ceiling lamp). The bigger the diameter of the track, the larger its powering range.

The DC bias is used to provide the light output. The alternating waveform then preferably has a frequency above a visible flicker frequency, so that the energy harvesting function does not affect the visual lighting appearance.

In another set of examples, the track configuration comprises shaped segments between the lighting elements. This is different from the above example wherein the overall of the track is used as a radiator.

In this way, discrete energy transfer areas may be provided at the locations of the segments. With high frequency operation (for example in the MHz range or higher), small inductances may be needed for these segments, such as less than 1 µH. For energy harvesting, external devices may then be placed at the discrete energy transfer areas.

Each shaped segment for example comprises a coil arrangement or transmission line arrangement, and the inductance of each shaped segment is at most 1 µH.

The module may be adapted to be coupled to a cover with a plurality of receiving elements, and each shaped segment is adapted to be aligned with one receiving element.

The receiving elements each receive power from a respective shaped segment, to provide the discrete energy transfer areas. One area may provide energy for one respective wireless device, or multiple (or all) receiving elements may combine to provide power to a common external device.

In all examples, the driver may comprise a switch mode power supply.

The frequency of the alternating waveform is for example based on the switching frequency of the switch mode power supply, which may be from kHz to MHz. It is thus an already present ripple current within the driver, which is then employed rather than filtered out.

The driver for example has no EMI filter so that there is no deliberate attenuation of the conducted emission. The electromagnetic field generated is used for energy transferring, so no EMI filter is needed. This reduces the component count.

The driver may have no output smoothing capacitor, wherein said switch mode power supply is adapted to operate in continuous mode and provide a continuous output current with an AC component, wherein said AC component is with a variable amplitude of at least 500 mA and with a frequency of at least 50 kHz.

For driver designs which generate a continuous current, a smoothing capacitor is normally used to filter out any high frequency ripple. For some driver designs, the capacitor may instead be removed to result in the desired alternating current component being present.

The driver may instead be adapted to operate in discontinuous mode and provide a discontinuous output current, wherein the driver further comprises:

an output smoothing capacitor for smoothing the discontinuous output current; an AC blocking inductor between the output capacitor and the track; and an injection interface for generating an alternating current waveform component of at least 50 kHz and at least 500 mA into the track.

For driver designs which only generate an output current in certain phases of their switching cycle, a smoothing capacitor is still required to create the required DC current component. An extra inductor and capacitor may then be used to provide an isolated circuit for providing the desired alternating current component.

The module may further comprise a heat sink on the opposite side of the substrate to the at least one conducting track and lighting elements.

The heat sink may be non-metal or else it may be metal and then comprise a thermal coupling portion positioned at the lighting elements and a gap portion at the track where no lighting element is mounted for allowing radiations of the track.

The non-metal design prevents the heat sink performing an undesired electromagnetic shielding function. The metal design enables a metal heat sink to be used, but it is not present in the gaps wherein there is only track without LEDs, corresponding to the transmission coils. The blocking effect on the transmitted electromagnetic field is thus reduced.

The invention also provides a lighting system comprising:
a lighting module as defined above, wherein the substrate is rigid; and
a component for placing over or near the lighting module, the component comprising an energy harvesting circuit for harvesting energy from the varying electromagnetic field.

This system combines the lighting module with a wirelessly powered component. This saves energy and also enables smart lighting features to be implemented in a simple and low cost way. It can avoid the need for the components to have battery power.

The component for example comprises a sensor for controlling the lighting module, and said component is an optical cover.

The sensor is thus mounted over the module and harvests energy from it.

Examples in accordance with another aspect of the invention provide a method of controlling a lighting system, comprising:
providing a time-varying current, via a conducting track, to lighting elements of a lighting module which are mounted along the conducting track, said conducting track both conducting the current to the lighting elements and generating, with the time-varying current, a varying electromagnetic field for inductive power transfer as well as illuminating the lighting elements; and
using an external device provided at or near the lighting module to harvest energy from the varying electromagnetic field.

In further aspect of the invention, there is also a need to combine in the lamp the inductive powering with the popular visible light communication. Most advantageously, this combination has better to be a synthesis integration that reuses or shares some hardware, instead of having two separate respective modules for light communication and inductive transfer.

A basic idea of the further aspect of the invention is that frequency-multiplexing both visible light communication and inductive power/data in the same driving signal, and this driving signal is fed to both lighting elements and a magnetic element. The receiver of visible light communication is sensitive to the frequency of visible light communication and may be configured to bypass the frequency of the inductive power/data part; the receiver of inductive power/data may be configured to be sensitive to the inductive frequency, and may also use the visible light communication frequency or not use by ignore it. Thus a visible light communication and inductive power/data can be implemented in the same lighting module simultaneously. Further, the receiver of inductive power/data and the receiver of the visible light communication can be physically different device or physically integrated in the same device.

According to the further aspect of the invention, it is proposed a lighting module comprising: a magnetic element; lighting elements; and a driver for providing a current to the magnetic element and to the lighting elements, wherein the driver is adapted to provide a time-varying current which is adapted to illuminate the lighting elements and, in combination with the magnetic element, is adapted to generate a varying electromagnetic field for energy harvesting by an external device, wherein said driver is adapted for providing the current with a first and a second frequency components, a frequency of the first frequency component being larger than that of the second frequency component, and said magnetic element is adapted to react with the first frequency component to generate said varying electromagnetic field, and said lighting element is adapted to react with the second frequency component to generate light according to the second frequency component.

In this aspect, frequency multiplexing is used in the current to have both inductive component and visible lighting communication component, thus there is no need to have separate modulators for both channels, saving cost, space and complexity.

Preferably, the magnetic element and the lighting elements are in series connection. Thus the driver can inject the current into this series connection and driving both the magnetic element and the lighting elements very conveniently.

In a simple and low cost implementation for the magnetic element, it comprises a track on a substrate with a track configuration. More preferably, the track configuration comprises a smooth or angular spiral, and the lighting elements are distributed along the spiral. In this implementation, the wiring that connects the lighting elements is also the magnetic element, which is very low cost and saves space/dedicated magnetic component such as a drum core inductor. The spiral shape can provide desired inductance in a small area thus is advantageous for being used in lamps.

In an embodiment, the driver is adapted for providing the second frequency component with a frequency range of 1 k Hz to 10 k Hz so as to modulate the light generated by the lighting elements. More preferably, the driver is adapted for embedding first data symbols in said second frequency component, and for transmitting power in said first frequency component.

In this embodiment, the frequency range is the typical band for visible light communication such as coded light standard, thus it is compatible with present standards.

In an embodiment, the driver is adapted for providing the first frequency component with a frequency range that is larger than 100 k Hz so as to be harvested by the external device.

In this embodiment, such a high frequency range is the typical frequency in switching mode power supply and it suitable for inductive transfer. It is also compatible with present standards of inductive powering.

In a further embodiment, the driver is adapted for modulating the frequency component by using a third frequency component, and magnetic element is adapted to react with the third frequency component to generate said varying electromagnetic field.

This embodiment enables a third frequency to be multiplexed in the current, and providing another output channel in the lighting module.

In a further embodiment, the driver (14) is adapted for providing the third frequency component with a frequency range of 10 k Hz to 100 kHz.

In this embodiment, the third frequency component is between and would not interfere the first and the second frequency components thus the three channels are quite robust. There are in total two inductive channels.

In a further embodiment, the driver is adapted for embedding second data symbols in said third frequency component. This embodiment provides another channel for data communication, besides the second frequency component, and increases the data throughput of the lighting module.

In a further embodiment, the driver is adapted for embedding payload information as the second data symbol in the third frequency component, and for embedding checksum information of said payload information as the first data symbol in the second frequency component.

This embodiment provides a robust solution for data communication, and any error in the reception of the payload information can be detected or corrected by the checksum information.

In an alternative embodiment, the driver is adapted for embedding the same information respectively as the second data symbol and the first data symbol.

This embodiment provides redundant transmissions and in turn a robust solution for data communication.

In an alternative embodiment, the driver is adapted for embedding irrelevant information respectively as the second data symbol and the first data symbol. The data throughput rate of the embodiment is relatively high.

In a preferred embodiment, the driver is adapted for detecting a change in the first frequency component in response to a change in the impedance of the external device, and for retrieving a third data symbol from said change. This embodiment enables a reception in the driver to receive data from the external device. Thus duplex communication in the lighting module can be achieved.

In a preferred embodiment, the driver is adapted for embedding circuit or operation information of the driver as the first data symbols or the second data symbols. This provides an application of the invention and could be used together with the solution disclosed in a prior application PCT/CN2016/083947/ to improve the identification of the driver and measuring its power consumption, which prior application discloses extracting the switching characteristic in the high frequency power commination signal of the switching mode power supply and identifying the switching mode power supply according to the switching characteristic. This preferred embodiment can send other information which is not contained in the power commination signal, and information may be the transformer inductance, driver efficiency and so on.

In a second aspect of the application, it is provided a lighting system comprising: a lighting module as claimed in any preceding claim; and a external device for placing over or near the lighting module, the external device comprising an energy harvesting circuit for harvesting energy from the varying electromagnetic field.

In a further embodiment, the lighting system further comprising: a lighting detection device, adapted for receiving light generated by said lighting module and detecting the second frequency component.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting module in which a conducting track used to provide a current to lighting elements is also used as a source of a varying electromagnetic field, so that an external device may harvest energy from that field.

Figure 1:
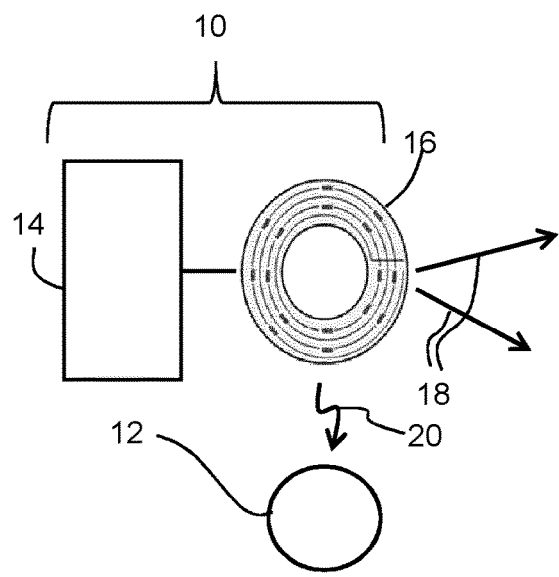
FIG. 1 shows a lighting system, comprising a lighting module and an external component which harvests energy from an electric field generated by the lighting module.
Figure 1:
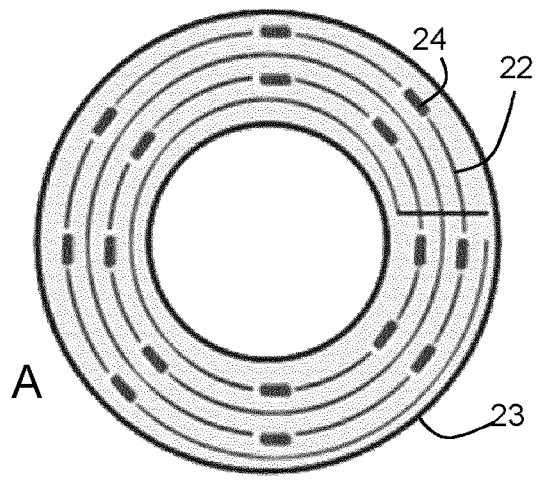

FIG. 1 shows a lighting system, comprising a lighting module 10 and an external component 12 which harvests energy from an electric field generated by the lighting module. The external component for example comprises a light sensor used for automatically controlling the operation of the light module 10.

The lighting module 10 has a driver 14 and a lighting element 16, for example in the form of an LED arrangement provided on a conducting track arrangement of a printed circuit board. The lighting element generates a light output 18 and also an intended time-varying electromagnetic field 20. This is generated by providing a time-varying current to the LEDs of the LED arrangement, which in combination with the track configuration generates the intended varying electromagnetic field. The term "intended" means it is intended to be substantially harvested by the external device.

The external device 12 is for placing over or near the lighting module 10, and it comprises an energy harvesting circuit for harvesting energy from the varying electromagnetic field 20. The energy harvesting circuit is completely conventional, and comprise a pick up coil and reception circuitry including a resonant circuit, a rectifier circuit, a converter circuit, and a load.

The conducting track arrangement is a required part of the lighting module so the energy generation does not require additional components. It is implemented by providing a suitable drive current from the driver to a suitable track configuration. In this way, energy which would otherwise be wasted is positively used for energy harvesting purposes.

The technology for energy harvesting for wireless power technology, based on electromagnetic coupling, is well known. The use of the conductor track and the lighting element driver avoids the need for the more typical half bridge or full bridge driven resonation circuit as well as a dedicated inductive power transmission coil. The arrangement of the invention is particularly suitable for energy transfer from a lighting module/luminaire to devices with low power rating. The external device may typically also include a storage component to act as a buffer. This means the control requirements and power rating are low.

The time-varying current has a DC component and an AC component. The frequency of the AC component is suitable for generating an alternating electromagnetic field for inductive power transfer. The frequency is for example in the kHz to MHz range. The frequency is higher than the relative low frequency with which a DC current level is adjusted, like when a dimming level changes.

For low power applications, the wireless power transfer may be effective over relatively long distances (many centimeters) to power a nearby module or charge a battery within such a module.

In a first set of examples, the conducting track arrangement comprises a track in the shape of a smooth or angular spiral. The general shape of the track then functions as an inductor coil which generates the desired electromagnetic field.

FIGS. 2A to 2E show various possible track configurations based on a generally spiral design. They each comprise a conductor track 22 over a substrate 23. The basic requirement for a wireless power transfer system is a transmission coil with an AC current component.

Figure 2:
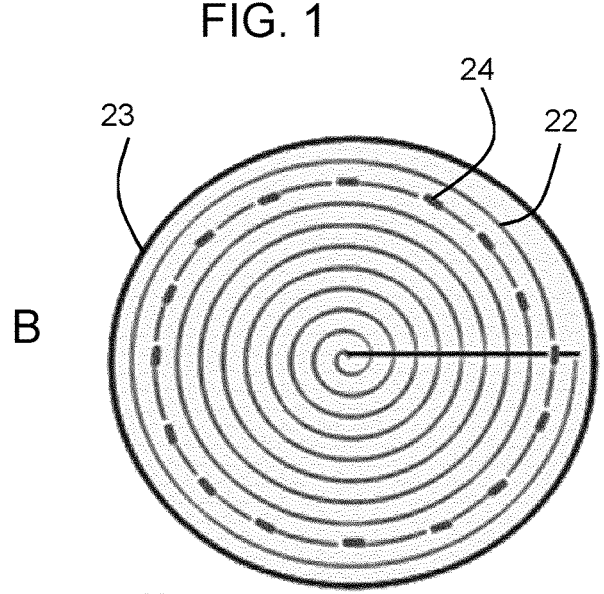
FIG. 2 shows various possible track configurations based on a generally spiral design.
Figure 2:
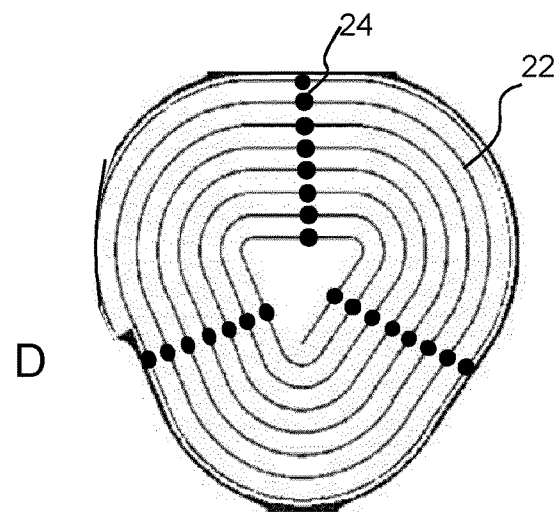
Figure 2:
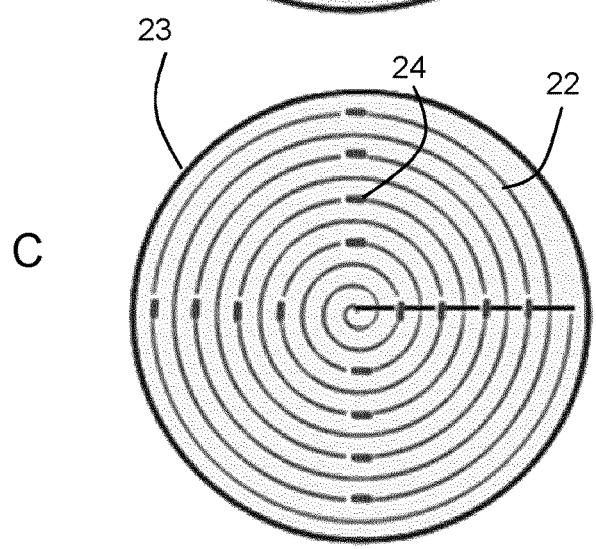
Figure 2:
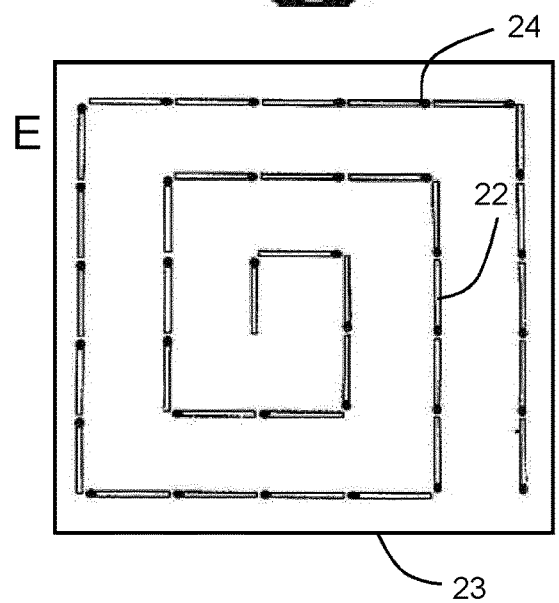

FIG. 2A shows a spiral track 22 having a set of LEDs 24 along its length. The spacing is non-uniform so that the eventual pattern of LEDs comprises 8 radial lines of LEDs. The overall shape is annular so that a ring of light is output from the device. This means the track forms an inductive coil with a central opening.

FIG. 2B shows a spiral track 22 having a set of LEDs 24 along only the first outer turn of the spiral coil. The spacing is uniform so that there is a uniform single ring of illumination. In this example, the overall shape is circular and the track extends fully to the center. There may be LEDs on one turn of the spiral (FIG. 2B), on all turns (FIG. 2A) or on a sub-set of the turns.

FIG. 2C shows a spiral track 22 having a set of LEDs 24 along its length. The spacing is again non-uniform so that the eventual pattern of LEDs comprises four radial lines of LEDs. The overall shape is circular. There are LEDs on each spiral turn, but they are spaced by 180 degrees on each turn so that the LED spacing along each radial line is double the spacing of the turns.

The spiral does not need to be smooth. FIG. 2D shows an angular spiral track 22 in which each ring of the spiral is essentially triangular. FIG. 2E shows an angular spiral track 22 in which each ring of the spiral is essentially rectangular/square.

The number of turns and the winding diameter will depend on the optical design and the electrical design, for example taking account of the required wireless charging power rate and the proximity of the external device.

By way of example, a 300 mm diameter coil has about 50 µH inductance based on only 5 turns. The inductance of the track is for example at least 50 µH when a single general coil shape is used to provide the electromagnetic field. The examples above show that the optical design may be edge emitting, or based on emission over the entire module area.

Figure 3:
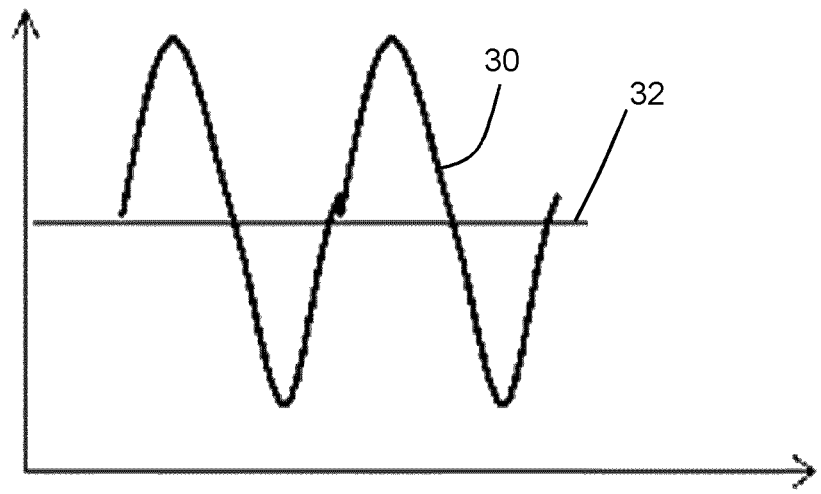
FIG. 3 shows an example of a suitable drive current.

FIG. 3 shows an example of a suitable drive current 30 for driving the LEDs. There is a DC bias level 32 over which a high frequency (kHz or MHz) AC component is superposed.

The LEDs require a DC current to emit light, whereas the alternative current component generates the required alternating electromagnetic field for wireless power transfer. The AC component is sufficiently high frequency to prevent visible flicker. The ripple/AC amplitude in FIG. 3 is only schematic.

Figure 4:
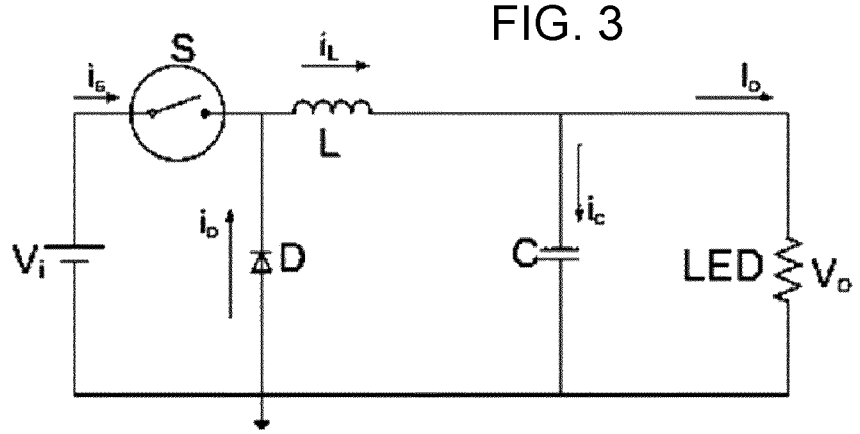
FIG. 4 shows one possible switch mode power supply.

The driver 14 is a switch mode power supply, for example a single stage low power factor buck converter LED driver as shown in FIG. 4. This example comprises a main switch S, a flyback diode D and an energy store in the form of an inductor L, which delivers continuous current to the LED arrangement (represented as a single LED). An output filter capacitor C is also shown.

In this design, the current is continuous even if the output filter capacitor C is removed. In such a case, the output current will then have a current ripple with a ripple frequency which corresponds to the frequency of operation of the main switch S, for example 50 kHz.

Since the ripple current frequency is the same as switching frequency there is no visible flicker.

Thus, in this set of designs, the driver may be arranged with no output smoothing capacitor, and the switch mode power supply operates in continuous mode. The AC component for example has a variable amplitude (i.e. peak-to-peak current variation) of at least 500 mA and has a frequency of at least 50 kHz corresponding to the switching frequency.

Figure 5:
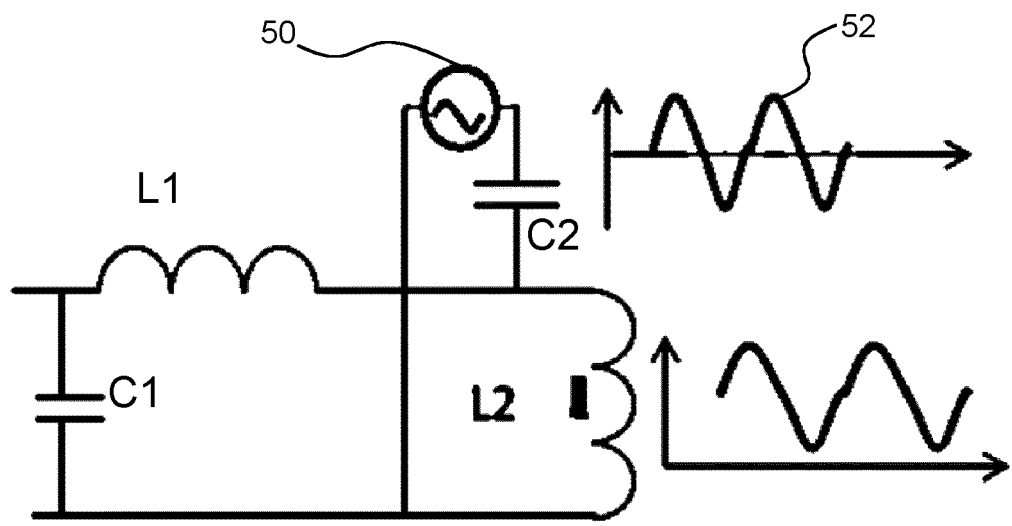
FIG. 5 shows an example circuit for injecting an AC current component when the driver has a smoothing capacitor.

For single stage drivers with power factor correction, and for separate power factor correction and driver circuits, the inductor current is typically not continuous, so that an output capacitor is required. In this case, the driver operates in a discontinuous mode. Thus an output smoothing capacitor may be a must. In this case the AC component may be injected into the current after the switch mode power supply of the driver. FIG. 5 shows an example circuit for injecting the AC current component when the driver has an output smoothing capacitor C1.

An AC blocking inductor L1 is provided between the output capacitor and the conducting track which is represented as inductor L2.

An injection interface 50 is provided for generating an alternating current waveform component 52 of at least 50 kHz and at least 500 mA into the track.

The injection interface couples to the conducting track through a DC blocking capacitor C2 which only passes the AC current. The inductor L1 prevents the AC signal from the capacitor C2 passing back into the driver and then influencing the driver function, in particular due to resonance. The desired AC frequency and amplitude depends on the capacitor C2 and injection signal, and the DC current is determined by the driver output voltage and inductance L2.

As mentioned above, for continuous mode driver circuits, the output smoothing capacitor may be omitted. In all cases, EMI filtering may also be omitted.

Most luminaire designs require a heat sink to help dissipate the generated heat. Typically, the heat sink is a metal sheet which is placed under the circuit board. In this application, this metal heat sink may absorb the varying electromagnetic field (and generate heat) which may result in low wireless charging efficiency.

One simple solution is to use a glass or ceramic to replace the metal heat sink. Because LED efficiency is becoming higher, an increasing number of applications are able to use lower cost non-metal materials for heat dissipation. Some applications may even not require any heat sink.

Figure 6:
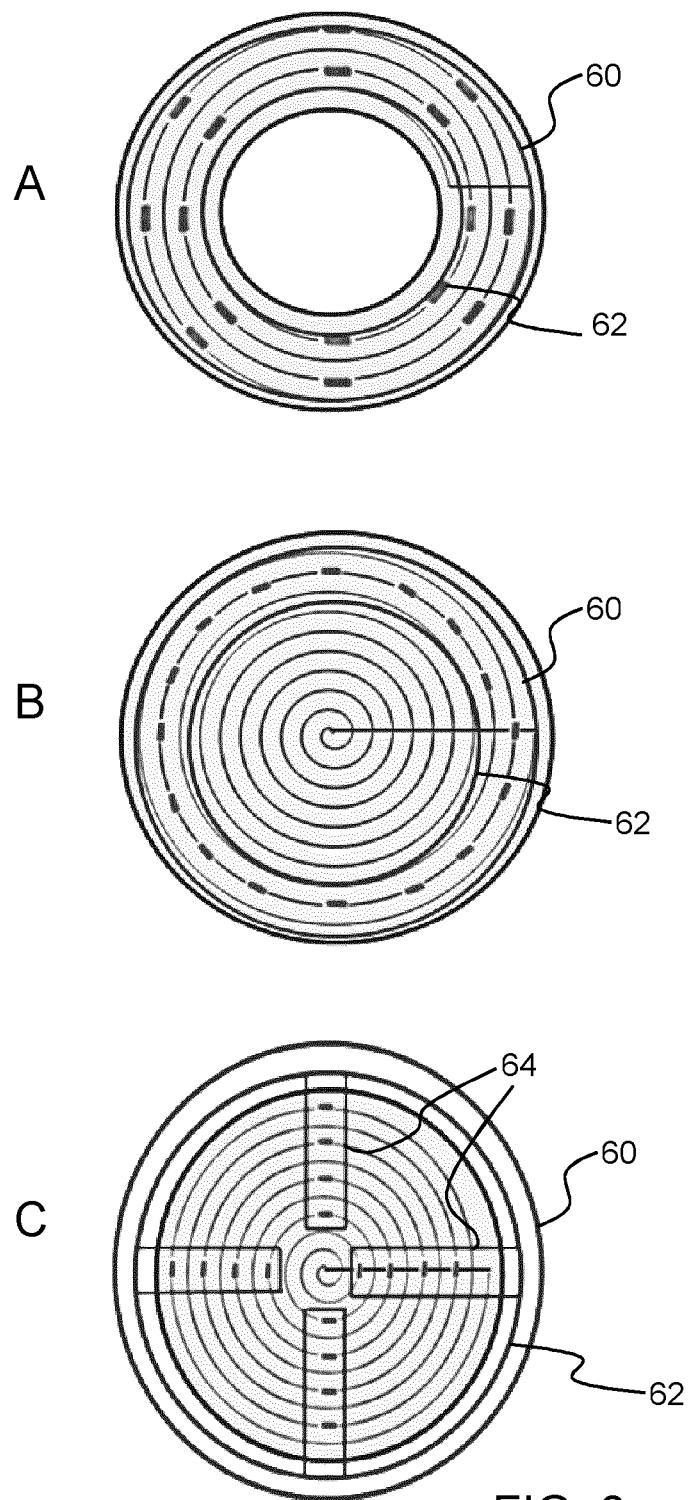
FIG. 6 shows three possible heat sink designs.

For applications which require a metal heat sink, FIG. 6 shows three possible heat sink designs.

FIG. 6A shows an annular heat sink with an outer edge 60 and an inner edge 62, represented as provided beneath the circuit board design of FIG. 2A.

The particular shape of the heat sink may be chosen to minimize the effect on the wireless charging system. FIG. 6B shows an annular heat sink with an outer edge 60 and an inner edge 62, represented as provided beneath the circuit board design of FIG. 2B. Note that the annular heat sink has an opening/gap at the inner turns of the track.

FIG. 6C shows an annular heat sink with an outer edge 60 and an inner edge 62 and radial fins 64 at the LED locations, represented as provided beneath the circuit board design of FIG. 2C. Note than the heat sink has gaps between the radial fins 64 where the track is present.

These designs avoid large metal areas at at least some portion of the track of the wireless charging circuit.

The examples above are all based on the general shape of the conducting track functioning as a coil. This provides a charging area generally free from the heat sink. One or more external devices within the general area may be charged or powered. The wireless charging range depends on the coupling between the transmitter coil and a receiver coil of the external device. A larger transmitter coil gives a larger charging range.

By making the transmitter coil as large as possible, the range is as large as possible, for example it may even enable a remote device to be charged, for example an external device placed on a desk beneath a desk lamp. For example, if the diameter of the transmitter coil reaches 300 mm, the wireless charging range may reach 150-300 mm.

If an external device is placed directly on the output surface (e.g. lens) of the luminaire the external device may function with no battery, and instead use capacitive storage (for times when the lighting is off).

An alternative to a single spiral or coiled track is to provide more local and discrete charging areas.

Figure 7:
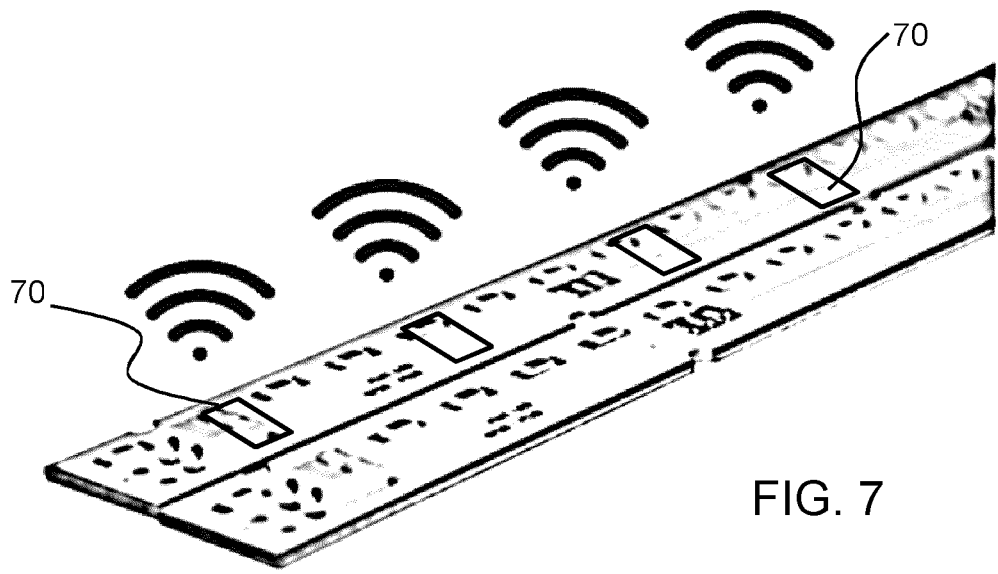
FIG. 7 shows a circuit board with a set of transmitter areas.

FIG. 7 shows a circuit board with a set of transmitter areas 70. The transmitter areas are formed as shaped segments of the conducting track, between the lighting elements. Each shaped segment for example comprises a coil arrangement or transmission line arrangement. The inductance of each shaped segment may be at most 1 µH. This is suitable for contact or near contact charging instead of remote charging, and it means there is reduced electromagnetic field strength (and therefore potential interference with other devices).

For this contact or near-contact power transfer, a cover may be used having a plurality of receiving elements, and each shaped segment is then aligned with one receiving element.

Figure 8:
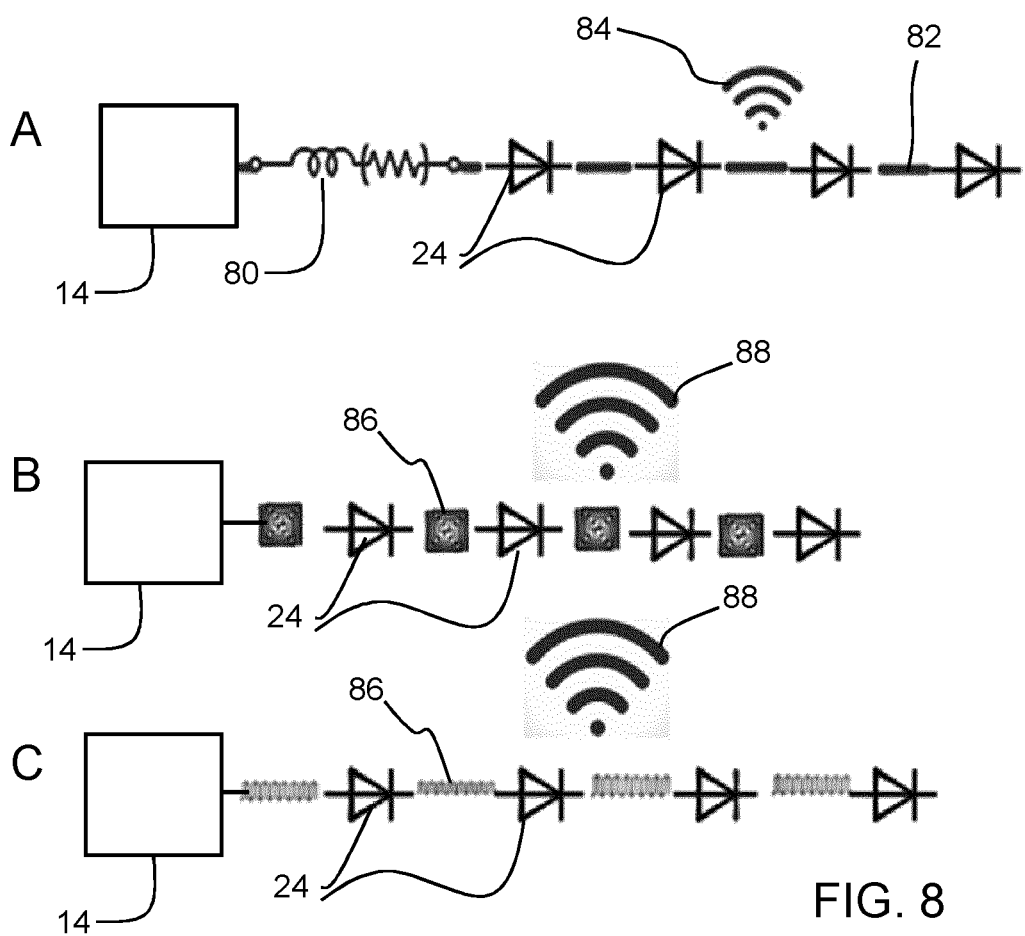
FIG. 8 shows possible lighting module designs.

FIG. 8 shows possible lighting module designs.

FIG. 8A shows the standard known arrangement. The driver 14 connects to the LED track through an EMI filter 80. The track section 82 between the LEDs is a straight line, instead of a shaped segment, and generates a small electromagnetic field 84 which is generally designed to be blocked by the housing design.

FIG. 8B shows a first design according to the above embodiment in which there is a shaped segment 86 in the form of a local coil, between the LEDs. The shaped segment generates a larger alternating electromagnetic field 88. As shown in FIG. 8B, the shaped segment is shaped into a spiral.

FIG. 8C shows a second design in which there is a shaped segment 86 in the form of a serpentine/square wave transmission line, between the LEDs. The shaped segment again generates a larger alternating electromagnetic field 88. A serpentine track requires no cross overs, whereas a coil requires a cross over to connect to the middle.

Preferably, in FIGS. 8B and 8C, no EMI filter is needed.

Because of the smaller inductance, the external device needs to be aligned with a respective shaped segment 86.

This alignment between the shaped segments and pick up coils can be achieved by forming the external devices as part of a cover.

Figure 9:
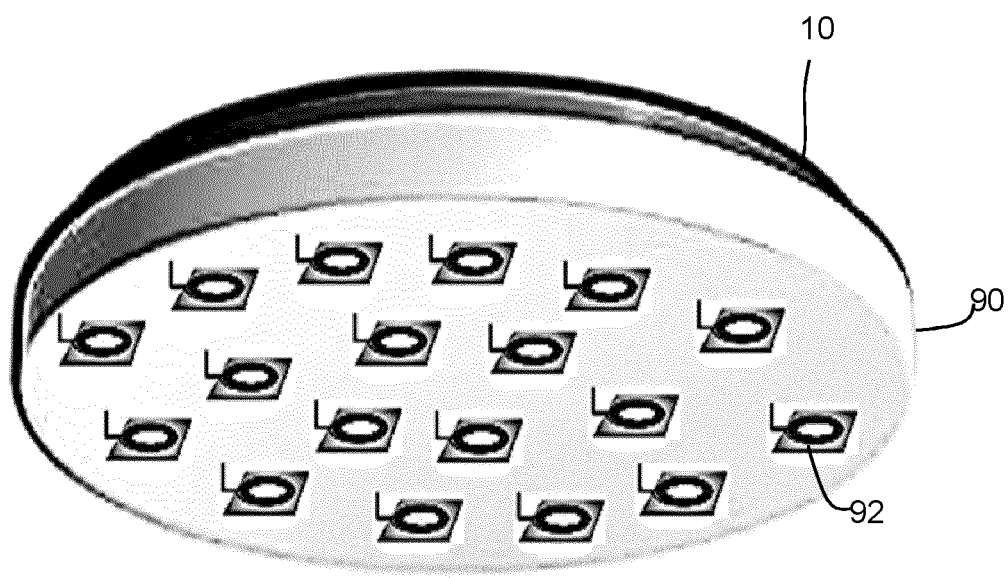
FIG. 9 shows a lighting module having a cover which carries a set of receiver coils.

FIG. 9 shows a lighting module 10 having a cover 90 which carries a set of coils 92 either for one external device, or for a set of external devices. The coils 92 are aligned with the shaped segments of the circuit board beneath.

This gives a two-part luminaire. The first part is the lighting module having an LED circuit board which emits the alternating electromagnetic field. The second part is the luminaire cover. It is for example printed with an energy harvesting coil array to harvest the energy emitted from the LED circuit board. The external component is for example a wireless sensor.

The coils 92 in the energy harvesting coil are positioned so that they do not block the light output. The energy harvested by each coil can be added up for providing a high voltage. The coils 92 can also be implemented by transparent/translucent material.

FIG. 9 is based on a circular arrangement of LEDs and transmitter coils.

Figure 10:
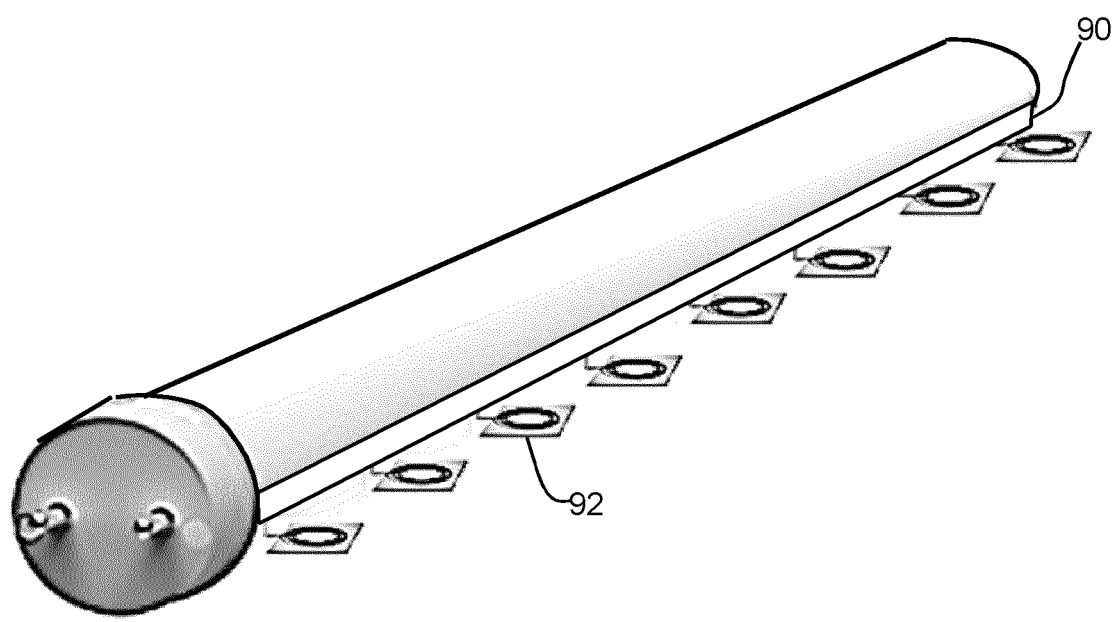
FIG. 10 shows a tubular LED having a line of receiver coils provided in a cover.

FIG. 10 shows a tubular LED having a line of coils 92 provided in a tubular cover.

The invention may be used in any type of luminaire or bulb, and is of particular interest when local sensing is desired in the vicinity of the light source. By providing energy to the external sensors by wireless power transfer, the system is easy to install and reconfigure. For the longer range implementation, the wireless power transfer may be used more generally, for example for charging a user device which is not directly related to the lighting system. Thus, the invention is not limited to providing power to devices which form part of the lighting control system. For the example of a desk lamp, it may have a charging function for mobile devices of the user, without the need to plug them in and enabling them to be kept at the workstation area.

The design may be scaled to any size. For a long range charging or powering system, a larger inductance is required, and an example of more than 50 μH is given above. For a short range charging system a smaller inductance may be used, and an example of less than 1 μH is given above for each coil or transmission line. However, this does not exclude systems having an inductance between these values. The frequency of operation is selected in combination with the inductance values to provide the desired energy transfer capabilities.

By using the above structure, one lighting module for both visible lighting communication channel and inductive channel is provided. More generally, the inductive element may be a magnetic element other than the above track.

Figure 11:
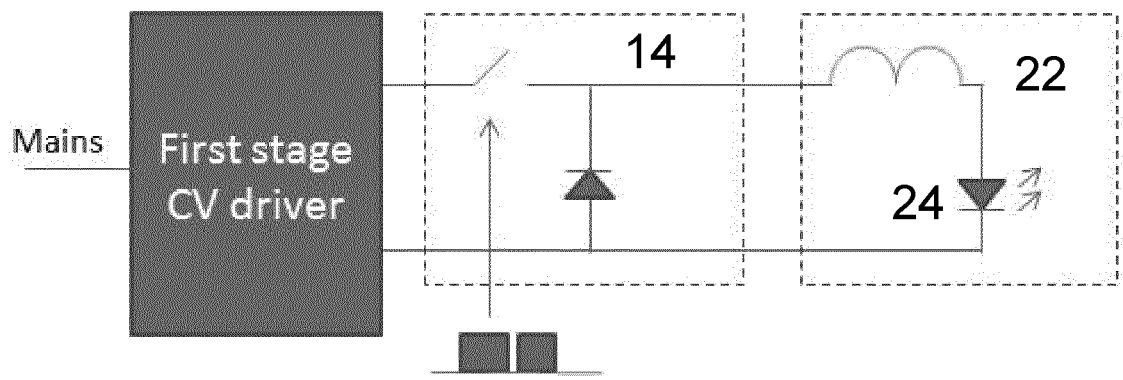
FIG. 11 shows a structure of the lighting module with a visible light communication channel and a magnetic channel.

As shown in FIG. 11, the proposed lighting module comprises:

a magnetic element 22;

lighting element(s) 24; and a driver 14 for providing a current to the magnetic element 22 and to the lighting elements 24, wherein the driver is adapted to provide a time-varying current which is adapted to illuminate the lighting elements 24 and, in combination with the magnetic element 22, is adapted to generate a varying electromagnetic field for energy harvesting by an external device, wherein said driver 14 is adapted for providing the current with a first and a second frequency components, a frequency of the first frequency component being larger than that of the second frequency component, and said magnetic element 22 is adapted to react with the first frequency component to generate said varying electromagnetic field, and said lighting element 24 is adapted to react with the second frequency component to generate light according to the second frequency component.

Figure 12:
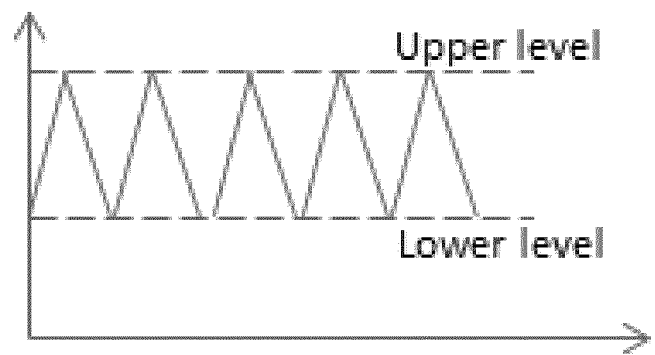
FIG. 12 shows the first frequency component signal for the magnetic channel.

Optionally as shown, the lighting module has a two-stage structure and may comprise an interface to receive mains AC power supply and a constant voltage (CV) stage before the driver 14. As an example, the driver 14 is a buck converter using hysteretic control mechanism in the LED current: the LED current alternates between a high level and a low level, as shown in FIG. 12, so the average LED current is constant. The magnetic element such as the inductor 12 reacts to this high frequency alternation and would generate a varying electromagnetic field for energy harvesting by an external device, as discussed above. The frequency of the power commutation of the buck converter is generally with a frequency range that is larger than 100 k Hz. In order to reduce flicker on the LEDs, a capacitor (now shown) can be further added in parallel with (each) LED so as to absorb the 100 k Hz ripple/first frequency component.

Figure 13:
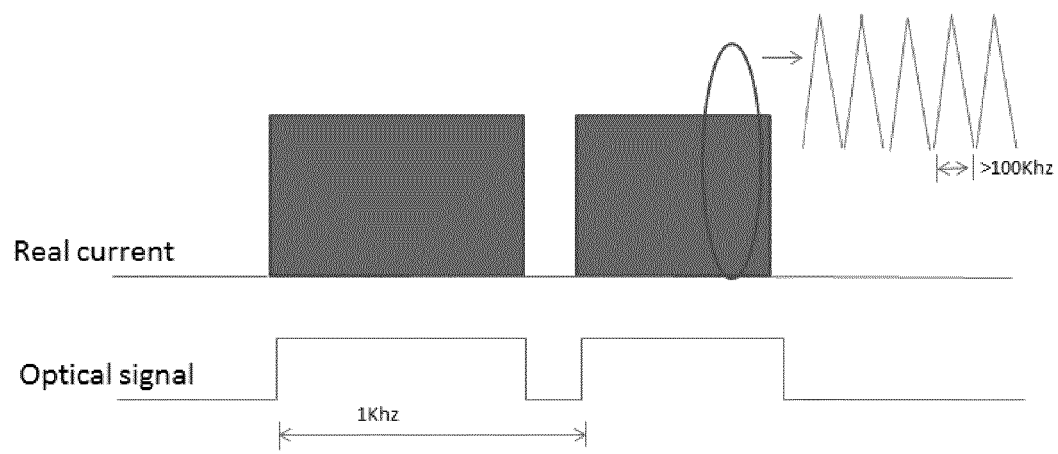
FIG. 13 shows the first frequency component signal and the second frequency component signal for the visible light communication channel.

The invention proposes to add another frequency component in the driving current. As shown in FIG. 13, the current is still 100 k Hz envelop signal, and a low frequency component as shown with 1 k Hz is added/modulates the 100 k HZ signal. The lighting element is adapted to react to this low frequency component and generate a light with a 1 k Hz alternation, to be sensed by an external light receiver such as coded light receiver. The frequency of 1 k Hz is only an example, and is can be from 1 k Hz to 10 k Hz, or even higher as long as it is detectable by the light receiver and a safety margin from the inductive frequency band is ensured. The above mentioned capacitor does not absorb the second frequency component thus the LED is capable of reacting to this second frequency component.

In order to achieve this, the buck converter can be disable at a frequency of the second frequency component.

Figure 14:
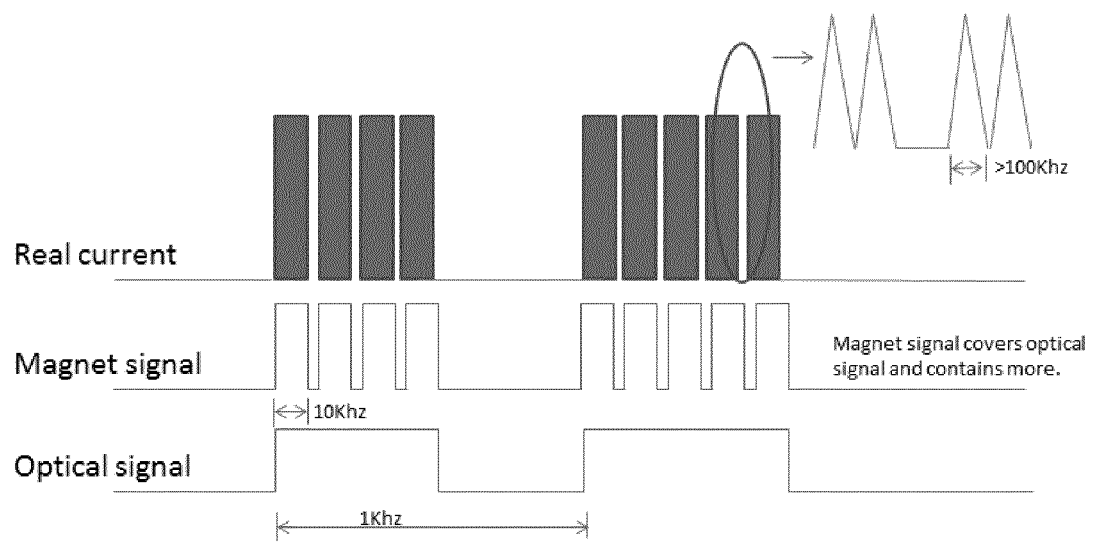
FIG. 14 shows the first, the second and the third frequency component signals.

Even further, a third frequency component can be multiplexed, which is higher than the second frequency component and undetectable in the visible light communication, but lower than the inductive powering frequency and detectable in inductive channel. FIG. 14 shows the schematic current wave form comprising the three frequency components. As shown, a 10 k Hz modulation is further applied which is detectable by the inductive receiver/harvester. Preferably, the 10 k Hz modulation contains the 1 k Hz signal, and more information at the 10K Hz frequency. The above mentioned capacitor is also capable of absorb the 10 k Hz ripple/third frequency component. In order to achieve this, the buck converter can be disable at a frequency of the third frequency component.

Figure 15:
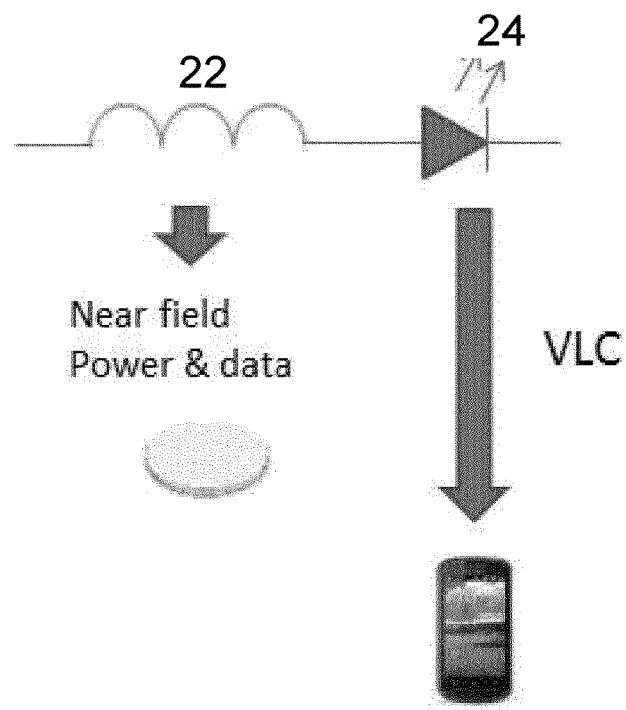
FIG. 15 schematically shows an application scenario of the invention.

FIG. 15 schematically shows the application scenario of the two channels: the lighting element 24 driven by the second frequency component for visible light communication (VLC) channel which is generally in far field; and the magnetic element 22 driven by the first and optionally the third frequency components for inductive powering and data communication with which is generally in near field.

VLC is long distance communication way and it provides address or location information which detected by smart phone camera. Magnetic field is only covering small range close the luminaire, it's perfect to be used as commissioning or sensing or other more secured communication with a small device. And the small device could be passive for that it could harvest the inductive power at the same time.

Figure 16:
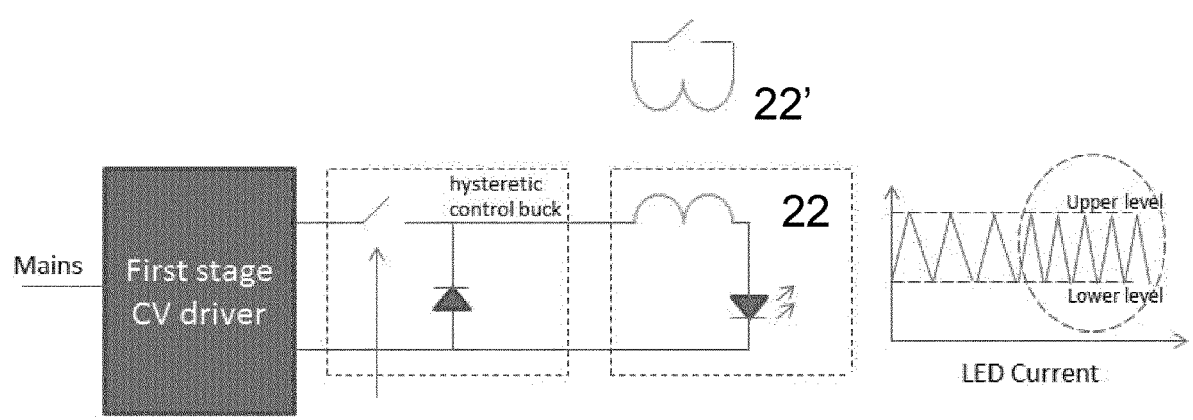
FIG. 16 shows the reception at the lighting module from the external device via the magnetic channel.

Even further, the inductive channel can be duplex instead of only transmitting from the lighting module to the external device. In order to allowing receiving at the lighting module from the external device, load modulation at the external device may be used. More specifically, since the external device is magnetically coupled to the magnetic element 22, its impedance/inductance has some influence in the inductance of the magnetic element 22. By modulating the inductance 22' of the external device, the inductance of the magnetic element 22 changes. As shown in FIG. 16, in a reception duration, the buck converter only commutates power on the current control loop, without multiplexing the second and the third frequency components. Due the inductance of the magnetic element 22 changes as the modulation in the external device, the frequency of the power commutation changes. By frequency detection (by internal MCU or frequency detection circuit), the lighting module/lamp/luminaire will get the data from the external device The data could be used for commissioning, sensor data or luminaire control.

As to the data to be communicated in the second frequency component and in the third frequency component, many alternatives are possible. For example, the data will be sent out by magnetic and VLC at same time and value, the receiver gets the data from these two channels and compare them. If the data is same then there's no error happen during communication. Or embedding payload information as the second data symbol in the third frequency component, and for embedding checksum information of said payload information as the first data symbol in the second frequency component.

In another application, driver's information can be send as the first data symbol or the second data symbol. These are preferably information that is not easy to be detected from outside. For example, PCT/CN2016/083947/discloses a solution that to detect some information of the driver from the high frequency power commutation signal and these detectable information comprises the driver switching frequency, duty cycle and waveform amplitude. Further, information that are less detectable is embedded according to the embodiment of the invention, such as driver topology, transformer parameters, system temperature, dimming level, input voltage, LED voltage and so on. From these two kinds of information, lamp diagnosis or power monitoring can be improved.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting module comprising:
a printed circuit board ("PCB");
at least one conducting wiring on the PCB having a track configuration;
a plurality of lighting elements mounted on the PCB along the at least one conducting wiring, said lighting elements comprising light emitting diodes ("LEDs"), and said conducting wiring comprising wiring sections between and electrically connecting the LEDs; and
a driver for providing a current, via the conducting wiring, to the lighting elements along the conducting wiring, wherein the driver is adapted to provide a time-varying current which is adapted to illuminate the lighting elements, wherein the track configuration is shaped to both conduct the current to the lighting elements for illumination and generate, with the time-varying current, a varying electromagnetic field for inductive power transfer for energy harvesting by an external device.

2. The module as claimed in claim 1, wherein the track configuration comprises at least one of a smooth spiral and an angular spiral, and wherein the lighting elements are distributed along the at least one spiral.

3. The module as claimed in claim 2, wherein the driver is adapted to generate an alternating current waveform with a DC bias, and wherein the conducting wiring as an inductance of at least 10 μH, and wherein the lighting elements are distributed at least one of: along at least one turn of the spiral, and over a plurality of turns of the spiral.

4. The module as claimed in claim 1, wherein the conducting wiring sections are shaped between the lighting elements.

5. The module as claimed in claim 4, wherein each of the wiring sections comprise a coil arrangement or transmission line arrangement, and the inductance of each shaped wiring section is at most 1 μH.

6. The module as claimed in clam 4, wherein the module is adapted to be coupled to a cover with a plurality of receiving elements, and each shaped wiring section is adapted to be aligned with one receiving element.

7. The module as claimed in claim 1, wherein the driver comprises a switch mode power supply.

8. The module as claimed in claim 7, wherein the driver has no EMI filter.

9. The module as claimed in claim 7, wherein the driver has no output smoothing capacitor, wherein said switch mode power supply is adapted to operate in continuous mode and provide a continuous output current with an AC component, wherein said AC component is with a variable amplitude of at least 500 mA and with a frequency of at least 50 kHz.

10. The module as claimed in claim 7, wherein the driver is adapted to operate in discontinuous mode and provide a discontinuous output current, wherein the driver further comprises:
an output smoothing capacitor for smoothing the discontinuous output current;
an AC blocking inductor between the output capacitor and the wiring; and
an injection interface for generating an alternating current waveform component of at least 50 k Hz and at least 500 mA into the track.

11. The module as claimed in claim 1, further comprising a heat sink on the opposite side of the PCB to the at least one conducting wiring and lighting elements.

12. The module as claimed in claim 11, wherein:
the heat sink is non-metal; or
the heat sink is metal and comprises a thermal coupling portion positioned at the lighting elements and a gap portion at the wiring where no lighting element is mounted for allowing radiations of the wiring.

13. A lighting system comprising:
a lighting module as claimed in claim 1, wherein the PCB is rigid; and
a component for placing over or near the lighting module, the component comprising an energy harvesting circuit for harvesting energy from the varying electromagnetic field.

14. The system as claimed in claim 13, wherein the component comprises a sensor for controlling the lighting module, and said component is an optical cover.

15. A method of controlling a lighting system, comprising:
providing a time-varying current, via a conducting wiring on a printed circuit board ("PCB"), to lighting elements of a lighting module which lighting elements are light emitting diodes ("LEDs") mounted along the conducting wiring on the PCB, said conducting wiring comprising wiring sections between and electrically connecting the LEDs for both conducting the current to the lighting element and generating, with the time-varying current, a varying electromagnetic field for inductive power transfer as well as illuminating the lighting elements; and
using an external device provided at or near the lighting module to harvest energy from the varying electromagnetic field.

* * * * *